United States Patent
Morita (10) Patent No.: US 9,090,122 B2
(45) Date of Patent: Jul. 28, 2015

(54) WHEEL BEARING APPARATUS FOR A VEHICLE

(71) Applicant: NTN Corporation, Osaka-shi (JP)

(72) Inventor: Shunsuke Morita, Iwata (JP)

(73) Assignee: NTN Corporation, Osaka-shi (JP)

( * ) Notice: Subject to any disclaimer, the term of this patent is extended or adjusted under 35 U.S.C. 154(b) by 38 days.

(21) Appl. No.: 13/874,742

(22) Filed: May 1, 2013

(65) Prior Publication Data

US 2013/0241270 A1   Sep. 19, 2013

Related U.S. Application Data

(63) Continuation of application No. PCT/JP2011/075142, filed on Nov. 1, 2011.

(30) Foreign Application Priority Data

Nov. 2, 2010  (JP) .................................. 2010-246057

(51) Int. Cl.
| | | |
|---|---|---|
| *F16C 33/72* | (2006.01) | |
| *B60B 27/00* | (2006.01) | |
| *F16C 33/78* | (2006.01) | |
| *F16C 33/80* | (2006.01) | |
| *F16C 19/18* | (2006.01) | |

(Continued)

(52) U.S. Cl.
CPC ......... *B60B 27/0005* (2013.01); *B60B 27/0073* (2013.01); *F16C 33/783* (2013.01); *F16C 33/7876* (2013.01); *F16C 33/805* (2013.01); *F16C 19/186* (2013.01); *F16C 33/586* (2013.01); *F16C 33/768* (2013.01); *F16C 2326/02* (2013.01)

(58) Field of Classification Search
CPC .............. B60B 27/0005; B60B 27/001; B60B 27/00073; B60B 27/0094; F16C 33/72; F16C 33/76; F16C 33/78; F16C 33/7816; F16C 33/782; F16C 33/7823; F16C 33/783; F16C 33/7886; F16C 33/805; F16C 2326/02
USPC ......... 384/477, 480, 481, 484, 485, 486, 544, 384/548
See application file for complete search history.

(56) References Cited

U.S. PATENT DOCUMENTS 5,803,617 A  *  9/1998  Ohnuki et al. ................. 384/486
8,303,190 B2 * 11/2012  Shigeoka ...................... 384/544
(Continued)

FOREIGN PATENT DOCUMENTS

| JP | 2003-049852 A | 2/2003 |
|---|---|---|
| JP | 2009-154591 A | 7/2009 |

(Continued)

*Primary Examiner* — Alan B Waits
(74) *Attorney, Agent, or Firm* — Harness, Dickey & Pierce, P.L.C.

(57) ABSTRACT

A vehicle wheel bearing apparatus has an outer member, an inner member, double row rolling elements, and seals. The outer-side seal has a metal core and a sealing member. The metal core has a cylindrical portion, a radially inner portion and a disk portion. The disk portion closely contacts the outer-side end face of the outer member. The sealing member has a side lip and a weir portion. The weir portion is formed around the outer circumference of the disk portion of the metal core. The weir portion covers the disk portion and is adhered to it. The weir portion projects radially outward from the outer circumference of the outer-side end of the outer member and elastically contacts the outer circumference.

13 Claims, 6 Drawing Sheets

(51) Int. Cl.
*F16C 33/76* (2006.01)
*F16C 33/58* (2006.01)

(56) References Cited

U.S. PATENT DOCUMENTS

| | | | |
|---|---|---|---|
| 2007/0076994 A1* | 4/2007 | Norimatsu et al. | 384/486 |
| 2007/0278748 A1* | 12/2007 | Matsui et al. | 277/549 |
| 2010/0129018 A1* | 5/2010 | Shigeoka | 384/544 |
| 2011/0206312 A1* | 8/2011 | Schumacher | 384/624 |
| 2011/0304197 A1* | 12/2011 | Norimatsu et al. | 301/110 |
| 2012/0007316 A1* | 1/2012 | Terasawa | 277/361 |
| 2012/0177315 A1* | 7/2012 | Matsuki et al. | 384/478 |

FOREIGN PATENT DOCUMENTS

| | | | |
|---|---|---|---|
| JP | 2009-197884 A | | 9/2009 |
| JP | 2010-159791 A | | 7/2010 |
| JP | 2010-241188 A | | 10/2010 |
| JP | 2010230150 A | * | 10/2010 |
| WO | WO-2010/079734 A1 | | 7/2010 |

* cited by examiner

PRIOR ART

WHEEL BEARING APPARATUS FOR A VEHICLE

CROSS-REFERENCE TO RELATED APPLICATIONS

This application is a continuation of International Application No. PCT/JP2011/075142, filed Nov. 1, 2011, which claims priority to Japanese Application No. 2010-246057, filed Nov. 2, 2010. The disclosures of the above applications are incorporating herein by reference.

FIELD

The present disclosure relates to a vehicle wheel bearing apparatus to rotatably support a wheel of vehicle, such as an automobile, and, more particularly, to a vehicle wheel bearing apparatus intended to improve the sealability of a seal especially in a fitting portion of the wheel bearing apparatus.

BACKGROUND

The vehicle wheel bearing apparatus rotatably supports a wheel hub for mounting a wheel, via a rolling bearing, for a driving wheel and for a driven wheel. For structural reasons, an inner ring rotation type is used for the driving wheels and both inner ring rotation type and the outer ring rotation type are used for the driven wheels. In general, the wheel bearing apparatus is classified as a so-called first, second, third or fourth generation type. In a first generation wheel bearing, it includes double row angular ball bearings fit between a knuckle and a wheel hub. In a second generation type, a body mounting flange or a wheel mounting flange is directly formed on the outer circumference of an outer member. In a third generation type, one of inner raceway surfaces is directly formed on the outer circumference of a wheel hub. In a fourth generation type, the inner raceway surfaces are directly formed on the outer circumferences, respectively, of a wheel hub and an outer joint member of a constant velocity universal joint.

The wheel bearing apparatus is usually arranged in a position on the vehicle where it is likely to be splashed with muddy water etc. Thus, it has sealing means to seal a space between an outer member and an inner member of the wheel bearing apparatus. As a result of verifying the damaged conditions of wheel bearing apparatus recovered from the market, it has been found that the wheel bearing apparatus has been damaged at a high proportion due to troubles caused by the sealing apparatus rather than natural causes, such as wear or peeling. Accordingly, the expected life of the bearing apparatus could be increased by improving the sealability and durability of the sealing means.

Figure 10:
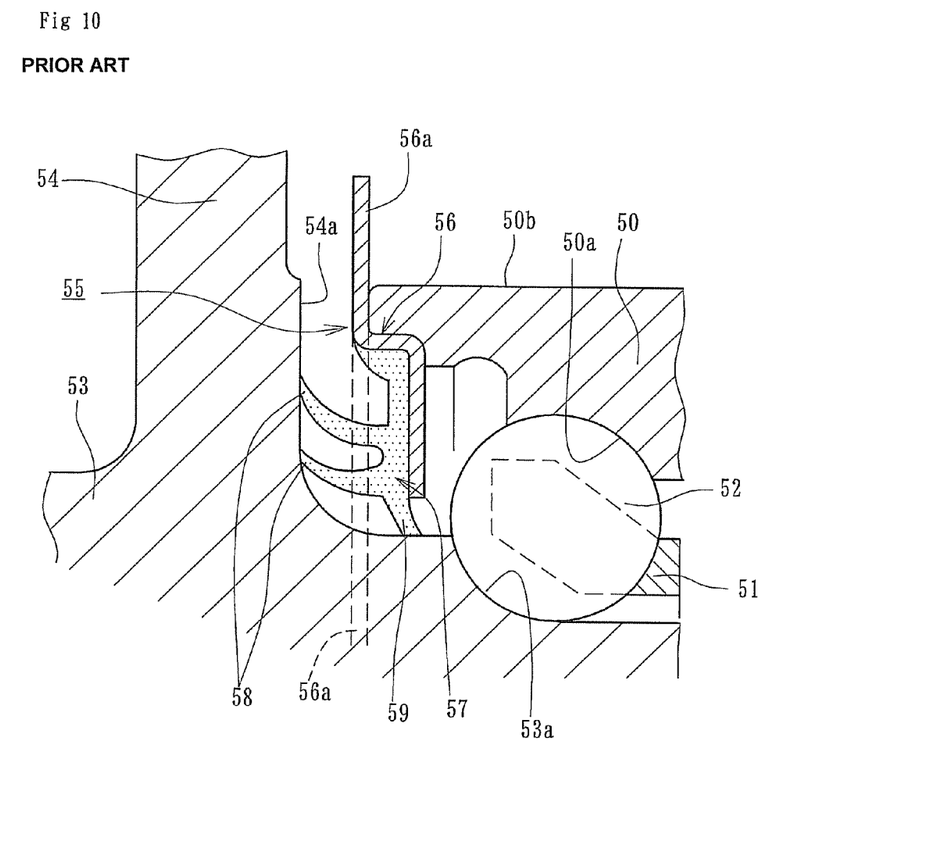
FIG. 10 is a partially enlarged view of a prior art sealing structure.

Several sealing structures have been proposed to improve their sealability. One representative example of a wheel bearing apparatus of the prior art equipped with such a sealing structure is shown in FIG. 10. This wheel bearing apparatus has an outer member 50 secured on a vehicle body via a knuckle. The outer member includes double row outer raceway surfaces 50a, (50a) formed on its inner circumference. In addition, a wheel hub 53 and an outer joint member of a constant velocity universal joint (not shown) are rotatably mounted on the outer member 50, via double row balls 52, (52), held equidistantly along their inner and outer raceway surfaces.

An inner raceway surface 53a is formed on an outer circumference of the wheel hub 53. The inner raceway surface 53a corresponds to one of the double row outer raceway surfaces 50a, (50a). A wheel mounting flange 54 is also formed on one end of the wheel hub 53. A brake disk and a wheel (not shown) are mounted on the outer wheel mounting flange 54.

A sealing structure 55 comprises an inner-side surface 54a of the wheel mounting flange 54, a metal core 56 fit into the inner circumference of the outer member 50, and an elastic sealing member 57 secured on the metal core 56. The elastic sealing member 57 includes two axial lip portions 58. The two lip portions 58 axially contact the side surface 54a of the wheel mounting flange 54. A radial lip portion 59 radially contacts the outer circumference of the wheel hub 53.

In addition, the metal core 56 has a radially extending weir portion 56a. The weir portion 56a is adapted to be in close contact with the outer-side end face of the outer member 50. This weir portion 56a is formed with a circular arc-shaped (i.e. crescent-shaped) configuration. Also, it is arranged in an upper-half region of the wheel bearing apparatus.

The sealing structure 55 prevents muddy water from flowing toward the side surface 54a of the wheel mounting flange 54, due to the presence of the weir portion 56a, when muddy water splashes over the outer member 50 during running of a vehicle. Accordingly, it is possible to prevent muddy water from remaining around the axial lip portions 58. Thus, it is possible maintain the sealability of the wheel bearing apparatus. See, Japanese Laid-open Patent Publication No. 2003-49852.

However, in such a sealing structure 55, it is necessary to set a small gap between the metal core 56 and the side surface 54a of the wheel mounting flange 54 in order to keep a desirable contact pressure of the axial lip portions 58 against the side surface 54a. This brings limitations in the degree of freedom in design of the wheel bearing apparatus. In addition, the weir portion 56a, having a crescent shape, is arranged only in an upper-half region of the wheel bearing apparatus. Thus, it is necessary for the weir portion 56a, at an upper-half region of the wheel bearing apparatus, to have the metal core 56 press-fit onto the outer member 50 during assembly of the wheel bearing apparatus. This increases assembling steps and time and thus the manufacturing cost. Furthermore, it is believed that the weir portion 56a would be plastically deformed by an impingement of pebbles, etc. during running of the vehicle.

SUMMARY

It is therefore an object of the present disclosure to provide a wheel bearing apparatus with improved sealability in the seal and in the fitting portion.

To achieve the object of the present disclosure, a vehicle wheel bearing apparatus comprises an outer member with a body mounting flange formed on its outer circumference. The body mounting flange is to be mounted on a knuckle. The outer member inner circumference includes double row outer raceway surfaces. An inner member includes a wheel hub and an inner ring. The wheel hub is formed on one end with a wheel mounting flange. A cylindrical portion axially extends from the wheel mounting flange. The inner ring is press-fit to the cylindrical portion of the wheel hub. The inner member is formed with inner raceway surfaces on its outer circumference. The double row inner raceway surfaces oppose the double row outer raceway surfaces. Double row rolling elements are freely rollably contained between the outer raceway surfaces of the outer member and the inner raceway surfaces of the inner member. Seals are mounted within annular openings formed between the outer member and the inner member. The outer-side seal of the seals includes a metal core and a sealing member. The metal core includes a cylindrical portion press-fit onto the outer-side end inner circumference of the outer member. A radially inner portion is bent and extends radially inward from the cylindrical portion. A disk portion extends radially outward from the cylindrical portion. The disk portion is adapted to be in close contact with the outer-side end face of the outer member. The sealing member is integrally adhered, via vulcanized adhesion, to the radially inner portion of the metal core. The sealing member includes a side lip and a weir portion. The side lip is inclined radially outward and is adapted to slidably contact the inner-side base portion of the wheel mounting flange, via an axial interference. The weir portion is formed around the outer circumference of the disk portion of the metal core. It covers the disk portion and is adhered to it. The weir portion is formed so that it projects radially outward from the outer circumference of the outer-side end of the outer member. Also, it elastically contacts the outer circumference.

The vehicle wheel bearing apparatus outer-side seal of the seals comprises a metal core and a sealing member. The metal core includes a cylindrical portion press-fit onto the outer-side end inner circumference of the outer member. Also, a radially inner portion extends radially inward from the cylindrical portion. Further, a disk portion extends radially outward from the cylindrical portion. The disk portion is adapted to be in close contact with the outer-side end face of the outer member. The sealing member is integrally adhered, via vulcanized adhesion, to the radially inner portion of the metal core. The sealing member comprises an integrally formed side lip and weir portion. The side lip is inclined radially outward and is adapted to slidably contact the inner-side base portion of the wheel mounting flange, via an axial interference. The weir portion is formed around the outer circumference of the disk portion of the metal core to cover the disk portion and to adhere to it. The weir portion projects radially outward from the outer circumference of the outer-side end of the outer member and elastically contacts it. Thus, it is possible to prevent the metal core from being damaged by pebbles during running of the vehicle or by interference of the weir portion with other parts of the wheel bearing apparatus during its assembly. In addition, it is possible to prevent rain water or muddy water from flowing into the space between the wheel mounting flange and the outer member, via the outer circumference of the outer member, during running of the vehicle. Accordingly, it is possible to provide a wheel bearing apparatus with a seal that improves sealability as well as the sealability of the fitting portion.

The outer circumference of the outer-side end of the outer member is formed as a smooth and smaller diameter portion by a machining process. The inner circumference of the weir portion of the sealing member elastically contacts it. The inner-side end of the outer member is formed with a chamfered portion by a machining process. The inner circumference of the weir portion of the sealing member elastically contacts it.

The weir portion of the sealing member is adhered to the metal core. Thus, it covers the exposed surface of the metal core. This makes it possible to suppress the generation of corrosion of the metal core. Thus, it is possible to use a cold rolled steel, that is low in price and is superior in workability, to achieve low manufacturing cost without using stainless steel sheet, that is high in price, to manufacture the metal core.

A projected fitting surface of a predetermined width is formed on the inner circumference of the weir portion of the sealing member. An undercut portion is formed on one side or both sides of the fitting surface. The provision of the undercut portions enables elastic deformation of the fitting surface of the weir portion to be absorbed by the undercut portion. Thus, this sets a larger interference of the weir portion. In addition, it is possible to further improve the sealability of the fitting surfaces between the weir portion and the outer member.

The outer circumference of the weir portions of the sealing member is formed with an inclined surface. This makes it possible to reduce the amount of material of the sealing member and also improve its moldability. Thus, this reduces the manufacturing cost.

A plurality of circumferential grooves is formed on the outer circumference of the weir portion of the sealing member. The circumferential grooves enable discharge of muddy water, etc. that overflow the weir portion outside of the wheel bearing apparatus. Also, it prevents the muddy water from directly flowing onto the side lips of the sealing member. Thus, this improves the sealability and durability of the wheel bearing apparatus.

The weir portion of the sealing member opposes the inner-side surface of the wheel mounting flange, via a small axial gap, to form a labyrinth seal therebetween. This makes it possible to prevent rain water or muddy water from entering onto the lip portions. Thus, this improves the sealability.

The sealing member further comprises an integrally formed dust lip. The dust lip is inclined radially outward at a radially inner position from the side lip. Also, an integrally formed grease lip is inclined toward the inner-side of the bearing. The base portion of the inner side of the wheel mounting flange is formed with a curved surface. The side lip and the dust lip slidably contact the base portion, via a predetermined axial interference. This makes it possible to improve the sealing performance of the seal.

A tip end of the disk portion of the metal core is bent to form a bent edge portion. This increases the strength and rigidity of the metal core. Also, it increases the connection between the metal core and the sealing member.

The inner-side base portion of the wheel mounting flange has a circular arc cross-section with a predetermined radius of curvature. An annular metal member is fit onto the base portion. The annular metal member has a curved portion formed with a circular arc cross-section corresponding to the curved surface of the base portion. A disk portion is adapted to closely contact the inner-side surface of the base portion. A ceiling portion axially extends from the radially outermost portion of the disk portion in a direction away from the wheel mounting flange. A radius of curvature "r" of the base portion is larger than a radius of curvature "R" of the curved portion of the annular metal member. The side lip and the dust lip slidably contact the annular metal member, via a predetermined axial interference. The grease lip also slidably contacts the annular metal member, via a predetermined radial interference. This makes it possible to prevent the generation of corrosion at the sliding contact portion of the lips. Thus, this keeps a desirable sealability for a long term. In addition, it is possible to prevent the curved portion of the annular metal member from interfering with the circular-arc portion of the base portion of the wheel mounting flange and from floating away from the base portion. Accordingly, it is possible to keep close contact between the side surface of the base portion of the wheel mounting flange and the annular metal member. Thus, this keeps stable sealability while suppressing variation of the interference of side lips, dust lip, and grease lip.

The ceiling portion of the annular metal member opposes the weir portion of the sealing member, via a small gap, to form a labyrinth seal. This makes it possible to prevent muddy water from directly entering onto the side lips. Also, it prevents entry into the wheel bearing apparatus, via the fitting portion between the side surface of the base portion and the annular metal member.

The annular metal member is press-formed from a steel sheet with corrosion resistance. It is finished to have the surface roughness Ra of 0.2-0.6. This makes it possible to obtain a superior sealing slide surface. Thus, this suppresses wear of the lips and keeps the sealability of the seal for a long term if the wheel bearing would be used under a severe environment.

The vehicle wheel bearing apparatus has an outer member with a body mounting flange formed on its outer circumference. The body mounting flange is mounted on a knuckle. The outer member inner circumference includes double row outer raceway surfaces. An inner member includes a wheel hub and an inner ring. The wheel hub is formed, on its one end, with a wheel mounting flange. A cylindrical portion axially extends from the wheel mounting flange. The inner ring is press-fit onto the cylindrical portion of the wheel hub. The inner member is formed with double row inner raceway surfaces on its outer circumference. The double row inner raceway surfaces oppose the double row outer raceway surfaces. Double row rolling elements are freely rollably contained between the outer raceway surfaces of the outer member and the inner raceway surfaces of the inner member. Seals are mounted within annular openings formed between the outer member and the inner member. The outer-side seal of the seals includes a metal core and a sealing member. The metal core includes a cylindrical portion, a radially inner portion and a disk portion. The cylindrical portion is press-fit onto the outer-side end inner circumference of the outer member. The radially inner portion is bent and extends radially inward from the cylindrical portion. The disk portion extends radially outward from the cylindrical portion and is adapted to closely contact the outer-side end face of the outer member. The sealing member is integrally adhered, via vulcanized adhesion, to the radially inner portion of the metal core. The sealing member includes a side lip and a weir portion. The side lip is inclined radially outward and is adapted to slidably contact the inner-side base portion of the wheel mounting flange, via an axial interference. The weir portion is formed around the outer circumference of the disk portion of the metal core. It covers the disk portion and is adhered to it. The weir portion projects radially outward from the outer circumference of the outer-side end of the outer member and elastically contacts it. Thus, it is possible to prevent the weir portion of the sealing member from interfering with other parts of the bearing apparatus during its assembly as well as the metal core from being damaged by pebbles during running of a vehicle. In addition, it is possible to prevent rain water or muddy water from flowing into the space between the wheel mounting flange and the outer member, via the outer circumference of the outer member, during running of a vehicle. Accordingly, it is possible to provide a wheel bearing apparatus with improved sealability of the seal as well as the fitting portions.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

A vehicle wheel bearing apparatus has an outer member formed with a body mounting flange on its outer circumference. The body mounting flange is mounted onto a knuckle. The outer member inner circumference includes double row outer raceway surfaces. An inner member includes a wheel hub and an inner ring. The wheel hub is formed, on its one end, with a wheel mounting flange. A cylindrical portion axially extends from the wheel mounting flange. The inner ring is press-fit onto the cylindrical portion of the wheel hub. The inner member is formed with double row inner raceway surfaces on its outer circumference. The double row inner raceway surfaces oppose one of the double row outer raceway surfaces. Double row rolling elements are freely rollably contained between the outer raceway surfaces of the outer member and the inner raceway surfaces of the inner member. Seals are mounted within annular openings formed between the outer member and the inner member. The outer-side seal of the seals includes a metal core and a sealing member. The metal core includes a cylindrical portion, a radially inner portion and a disk portion. The cylindrical portion is press-fit onto the outer-side end inner circumference of the outer member. The radially inner portion is bent and extends radially inward from the cylindrical portion. A disk portion extends radially outward from the cylindrical portion and is adapted to closely contact the outer-side end face of the outer member. The sealing member is integrally adhered, via vulcanized adhesion, to the radially inner portion of the metal core. The sealing member includes a side lip and a weir portion. The side lip is inclined radially outward and is adapted to slidably contact the inner-side base portion of the wheel mounting flange, via an axial interference. The weir portion is formed around the outer circumference of the disk portion of the metal core. It covers the disk portion and is adhered to it. The weir portion projects radially outward from the outer circumference of the outer-side end of the outer member and elastically contacts it.

A preferable embodiment of the present disclosure will be hereinafter described with reference to the drawings.

Figure 1:
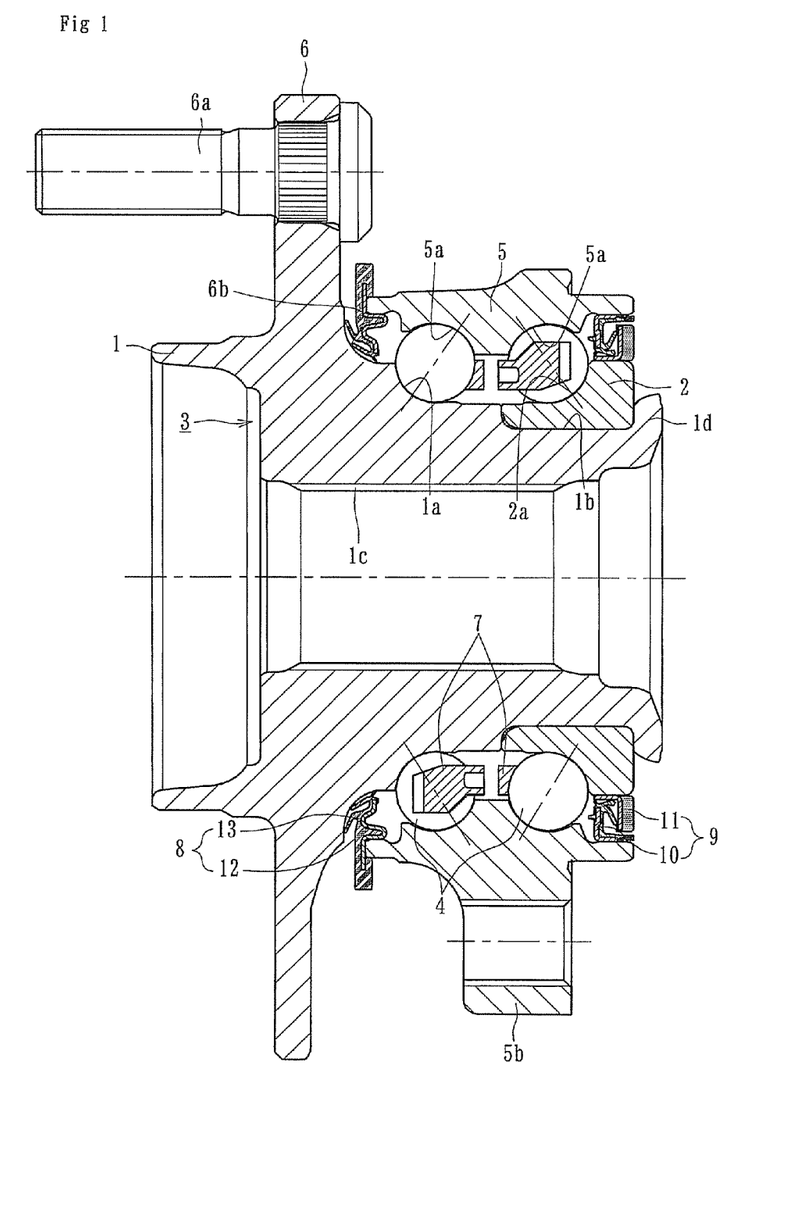
FIG. 1 is a longitudinal section view of a preferable embodiment of the vehicle wheel bearing apparatus.
Figure 2:
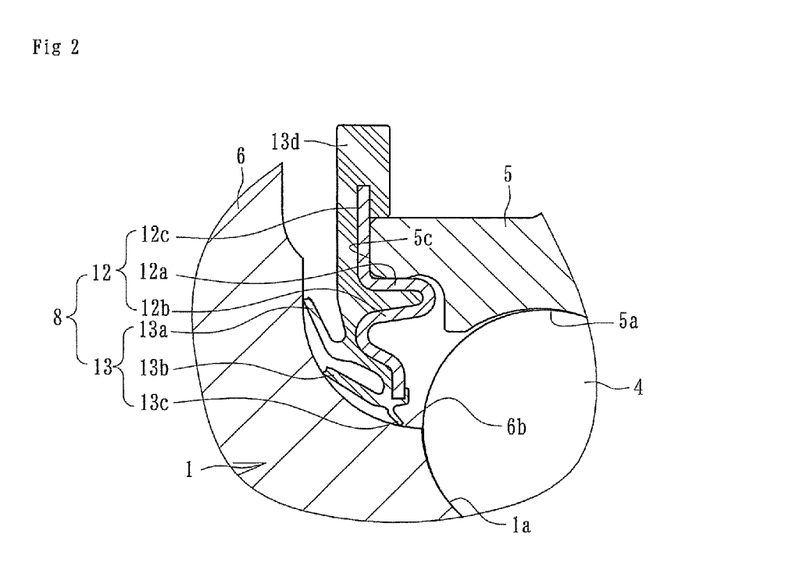
FIG. 2 is a partially enlarged view of a sealing portion of FIG. 1.
Figure 3:
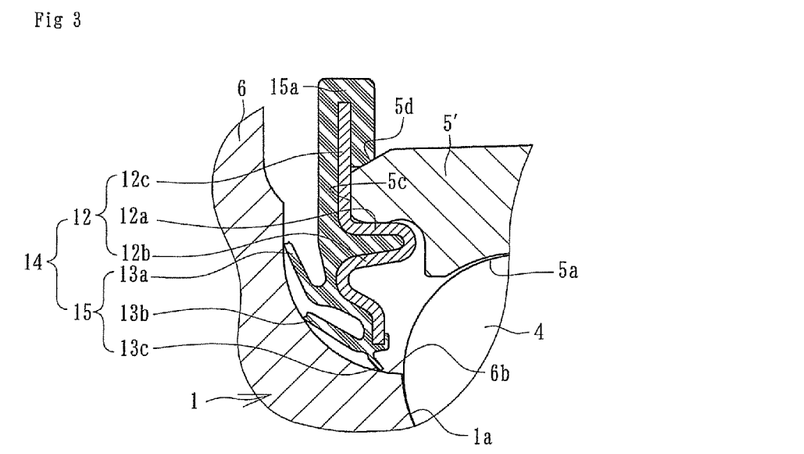
FIG. 3 is a partially enlarged view of one modification of FIG. 2.
Figure 4:
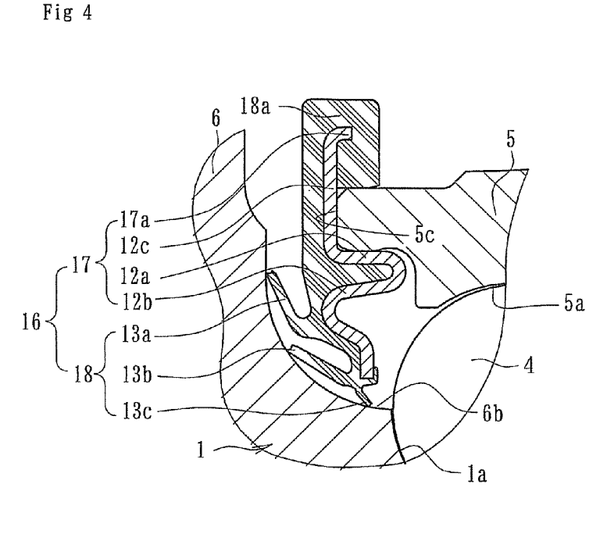
FIG. 4 is a partially enlarged view of another modification of FIG. 2.
Figure 5:
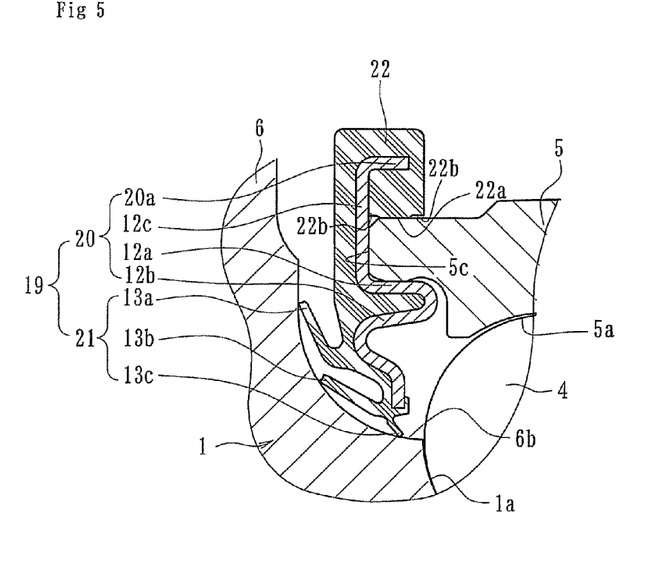
FIG. 5 is a partially enlarged view of a modification of FIG. 4.
Figure 6:
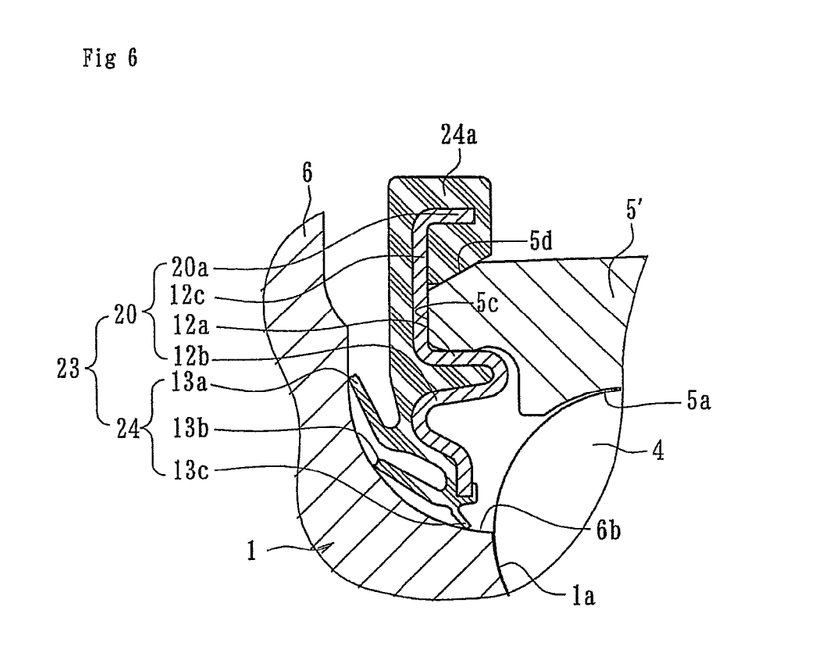
FIG. 6 is a partially enlarged view of one modification of FIG. 3.
Figure 7:
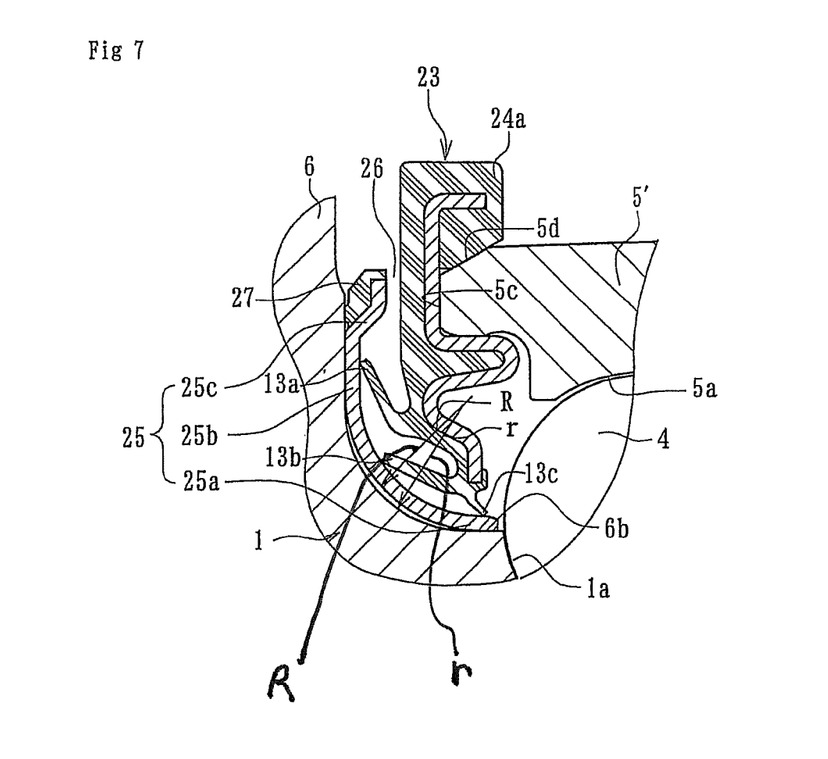
FIG. 7 is a partially enlarged view of one modification of FIG. 6.
Figure 8:
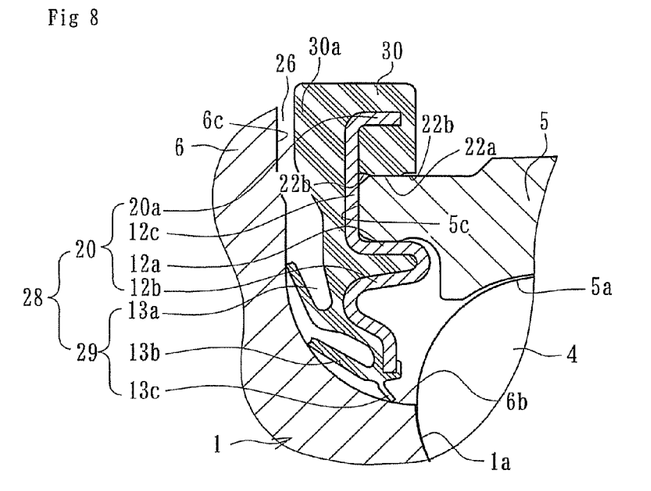
FIG. 8 is a partially enlarged view of one modification of FIG. 5.
Figure 9:
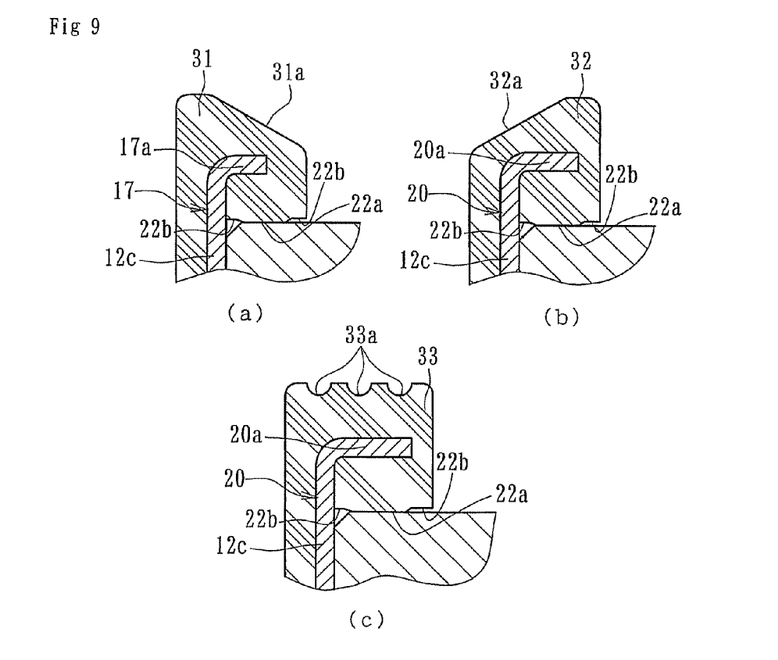
FIGS. 9(a)-(c) are partially enlarged views of modifications of the weir portion of the sealing portion.

FIG. 1 is a longitudinal section view of one preferable embodiment of the vehicle wheel bearing apparatus. FIG. 2 is a partially enlarged view of a sealing portion of FIG. 1. FIG. 3 is a partially enlarged view of one modification of FIG. 2. FIG. 4 is a partially enlarged view of another modification of FIG. 2. FIG. 5 is a partially enlarged view of one modification of FIG. 4. FIG. 6 is a partially enlarged view of one modification of FIG. 3. FIG. 7 is a partially enlarged view of one modification of FIG. 6. FIG. 8 is a partially enlarged view of one modification of FIG. 5. FIGS. 9(a)-(c) are partially enlarged views of modifications of the weir portion of the sealing portion. In descriptions of this specification, the term "outer-side" defines a side that is positioned outside of a vehicle body (left-hand side of FIG. 1). The term "inner-side" defines a side that is positioned inside of a vehicle body (right-hand side of FIG. 1) when the bearing apparatus is mounted on a vehicle.

The vehicle wheel bearing apparatus is a third generation type used for a driving wheel. It has an inner member 3 with a wheel hub 1 and an inner ring 2 secured to the wheel hub 1. An outer member 5 is fit onto the inner member 3, via double row rolling elements (balls) 4, 4.

The wheel hub 1 is integrally formed with a wheel mounting flange 6 at its one end. One (outer side) inner raceway surface 1a is formed on its outer circumference. A serration (or spline) 1c, for torque transmission, is formed on its inner circumference. A cylindrical portion 1b axially extends from the inner raceway surface 1a. Hub bolts 6a, for securing a wheel, are equidistantly arranged on the wheel mounting flange 6 along its periphery.

The inner ring 2 is formed on its outer circumference with the other (inner side) inner raceway surface 2a. The inner ring is press-fit onto the cylindrical portion 1b of the wheel hub 1, via a predetermined interference. The inner ring 2 is axially secured on the cylindrical portion 1b of the wheel hub 1 by a caulked portion 1d. The caulked portion is formed by plastically deforming the end of the cylindrical portion 1b under a predetermined pre-bearing pressure.

The wheel hub 1 is made of medium/high carbon steel including carbon of 0.40-0.80% by weight. It is hardened by high frequency induction quenching so that a region from an inner-side base 6b of the wheel mounting flange 6, forming a seal land portion of the seal 8, to the cylindrical portion 1b, including the inner raceway surface 1a, is hardened to have a surface hardness of HRC 58-64. The caulked portion 1d is not quenched and remains as is with its surface hardness after forging. On the other hand, the inner ring 2 and the rolling elements 4 are formed of high carbon chrome steel such as SUJ2. They are hardened to their core by dip quenching to have a surface hardness of HRC 58-64.

The outer member 5 is integrally formed with a body mounting flange 5b on its outer circumference. The body mounting flange 5b is mounted on a knuckle (not shown) forming part of the suspension apparatus of a vehicle. The outer member inner circumference is formed with double row outer raceway surfaces 5a, 5a. The double row outer raceway surfaces 5a, 5a oppose the inner raceway surfaces 1a, 2a of the inner member 3. Double row balls 4, 4 are contained between the outer raceway surfaces 5a, 5a and inner raceway surfaces 1a, 2a of the inner member 3. The balls 4, 4 are rollably held by cages 7, 7.

The outer member 5 is made, similarly to the wheel hub 1, of medium/high carbon steel including carbon of 0.40-0.80% by weight. At least surfaces of the double row outer raceway surfaces 5a, 5a are hardened by high frequency induction quenching to have a surface hardness of HRC 58-64.

Seals 8, 9 are mounted within annular openings formed between the outer member 5 and the inner member 3. The seals 8, 9 prevent leakage of grease contained in the bearing and infiltration of rainwater or dust into the bearing from the outside.

An inner-side seal 9 of seals 8, 9 is formed as a so-called pack seal with an annular sealing plate 10 press-fit, via a predetermined interference, into the inner-side end inner circumference of the outer member 5. It forms a stator member. A slinger 11 is press-lit onto the outer circumference of the inner ring 2, forming a rotor member. The slinger 11 is arranged opposite to the sealing plate 10. The outer-side seal 8 is formed as an integrated seal with a metal core 12 press fit onto the outer-side end inner circumference of the outer member 5, via a predetermined interference. A sealing member 13 is integrally adhered to the metal core 12 via vulcanized adhesion.

As shown in the enlarged view of FIG. 2, the metal core 12 is press-formed from a preserved cold rolled steel sheet (JIS SPCC etc.). It has an annular configuration and includes a cylindrical portion 12a, a radially inner portion 12b and a disk portion 12c. The cylindrical portion 12a is press-fit into the outer-side end inner circumference of the outer member 5, via a predetermined interference. The radially inner portion 12b extends radially inward from the cylindrical portion 12a. The disk portion 12c extends radially outward from the cylindrical portion 12a and is adapted to closely contact the outer-side end face 5c of the outer member 5. The close contact of the disk portion 12c against the outer-side end face 5c of the outer member 5 achieves accurate positioning of the seal 8 as well as improves the sealability between the seal 8 and the outer member 5.

On the other hand, the sealing member 13 is formed of synthetic rubber such as NBR (acrylonitrile-butadiene rubber). It is integrally adhered to the metal core 12 by vulcanized adhesion. As shown in the enlarged view of FIG. 2, the sealing member 13 includes a side lip 13a, a dust lip 13 and a grease lip 13c. The side lip 13a is inclined radially outward and is adapted to slidingly contact to the inner-side surface of the base portion 6b, via a predetermined axial interference. The dust lip 13b is also inclined radially outward at a radially inner position than the side lip 13a. The dust lip 13b is adapted to slidingly contact the base portion 6b of a circular-arc configuration, via a predetermined axial interference. The grease lip 13c is inclined radially inward and is adapted to slidingly contact the base portion 6b, via a predetermined radial interference.

Materials used for sealing member 13 other than NBR are e.g., HNBR (hydrogenated acrylonitrile-butadiene rubber), EPDM (ethylene propylene rubber) etc., having high heat resistance, as well as ACM (polyacrylic rubber), FKM (fluorinated rubber) or silicone rubber, having high heat resistance and chemical resistance.

Although shown here as a wheel bearing apparatus of a double row angular contact ball bearing using balls as the rolling elements 4, it should be noted that the present apparatus is not limited to such a wheel bearing apparatus. It can be applied to double row tapered roller bearings using tapered rollers as the rolling elements 4. In addition, although it is shown as a third generation type wheel bearing apparatus for a driving wheel, the present apparatus can be applied to wheel bearing apparatus of the second generation type or fourth generation type.

The tip end of the disk portion 12c of the metal core 12 projects from the outer circumference of the outer-side end of the outer member 5. The sealing member 13 is adhered to the metal core 12. The sealing member 13 covers an exposed surface of the metal core 12 over a region from the radially inner portion 12b to the disk portion 12c to form a weir portion 13d. Such an arrangement of the sealing member 13 avoids use of high price steel sheet, such as a stainless steel sheet, for the metal core material 12. Thus, a low priced cold rolled steel sheet with high workability may be used. Accordingly, this reduces the manufacturing cost of the wheel bearing apparatus. In addition, it is possible to prevent the weir portion 13d from being damaged by pebbles during running of a vehicle. Also, it prevents damage caused by interference of the weir portion 13d with other parts of the wheel bearing apparatus during its assembly as sometimes occurred to a naked metal weir portion of the prior art. In addition, the outer circumference of the outer-side end of the outer member 5 is machined by turning etc. to have a smooth surface and a smaller diameter portion. The inner circumference of the weir portion 13d elastically contacts the outer circumference of the outer member 5. Accordingly, it is possible to prevent rain water or muddy water from flowing into the space between the wheel mounting flange 6 and the outer member 5, via the outer circumference of the outer member 5 during running of the vehicle. Thus, it is possible to provide a wheel bearing apparatus seal 8 with excellent sealability, for a long term, as well as with a high sealability of the fitting portion.

FIG. 3 illustrates a modification of the seal 8 of FIG. 2. This seal 14 is different from the seal 8 only in the structure of the sealing member. Thus, the same reference numerals are used to designate the same parts and their detailed description will be omitted.

The seal 14 is an integrated seal with the metal core 12 press-fit onto the outer member 5". A sealing member 15 is adhered to the metal core 12. The sealing member 15 is formed of synthetic rubber such as NBR etc. It is integrally adhered to the metal core 12 by vulcanized adhesion. Similar to the sealing member 13 described above, this sealing member 15 includes the inclined radially outward side lip 13a, dust lip 13b and grease lip 13c. The dust lip 13b is inclined radially outward at a radially inner position from the side lip 13a. The grease lip 13c is inclined toward the inner-side of the bearing.

The sealing member 15 is adhered to the metal core 12. The sealing member 15 covers an exposed surface of the metal core 12 over a region from the radially inner portion 12b to the disk portion 12c to form a weir portion 15a. The inner circumference of the weir portion 15a elastically contacts the chamfered portion 5d of the outer member 5". Thus, it is possible to prevent the weir portion 15a from being damaged by pebbles during running of a vehicle. Also, it prevents interference of the weir portion with other parts of the wheel bearing apparatus during its assembly. Also, it obtains a stable contacting force and therefore sealability between the chamfered portion 5d and the weir portion 15a. Thus, it is possible to provide a wheel bearing apparatus that does not require a machining process to reduce the diameter of the outer circumference of the outer-side end of the outer member. Thus, it can be manufactured at low cost.

FIG. 4 is another modification of the seal 8 of FIG. 2. This seal 16 is different from the seal 8 only in part of the structure of the sealing member. Thus, the same reference numerals are used to designate the same parts and their detailed description will be omitted.

The seal 16 is an integrated seal including a metal core 17 press-fit onto the inner circumference of the outer-side end of the outer member 5. A sealing member 18 is adhered to the metal core 17. The metal core 17 is press-formed from cold rolled steel sheet with an annular configuration and including an integrally formed cylindrical portion 12a, a radially inner portion 12b, a disk portion 12c and a bent edge portion 17a. The cylindrical portion 12a is press-fit onto the inner circumference of the outer-side end of the outer member 5. The radially inner portion 12b is bent and extends radially inward from the cylindrical portion 12a. The disk portion 12c extends radially outward from the cylindrical portion 12a and closely contacts the outer-side end face 5c of the outer member 5. The bent edge portion 17a is formed by axially bending the tip end of the disk portion 12c. The provision of the bent edge portion 17a increases the strength and rigidity of the metal core 17 and also increases the connection between the metal core 17 and the sealing member 18.

The sealing member 18 is formed of synthetic rubber, such as NBR, and is integrally adhered to the metal core 17 by vulcanized adhesion. The sealing member 18 includes an inclined radially outward side lip 13a, a dust lip 13b, grease lip 13c and weir portion 18a. The dust lip 13b is inclined radially outward at a radially inner position from the side lip 13a. The grease lip 13c is inclined radially inward. The weir portion 18a covers an exposed surface of the metal core 17 over a region including the disk portion 12c of the metal core 17. This weir portion 18a has a width wider than those previously described. The weir portion inner circumference contacts the outer circumference of the outer-side end of the outer member 5. The wider width of the weir portion 18a further improves the sealability of the fitting portion between the weir portion 18a and the outer member 5.

FIG. 5 is a modification of the seal 16 of FIG. 4. This seal 19 is different from seal 16 only in the part of the structure of the sealing member. Thus, the same reference numerals are used to designate the same parts and their detailed description will be omitted.

The seal 19 is an integrated seal with a metal core 20 and a sealing member 21. The metal core 20 is press-fit onto the inner circumference of the outer-side end of the outer member 5. The sealing member 21 is adhered to the metal core 20. The metal core 20 is press-formed from cold rolled steel sheet with an annular configuration. The metal core 20 is integrally formed with the cylindrical portion 12a, the radially inner portion 12b, the disk portion 12c and a flange portion 20a press-fit onto the inner circumference of the outer-side end of the outer member 5. The radially inner portion 12b is bent and extends radially inward from the cylindrical portion 12a. The disk portion 12c extends radially outward from the cylindrical portion 12a and closely contacts the outer-side end face 5c of the outer member 5. The flange portion 20a is formed by axially bending the tip end of the disk portion 12c. The provision of the flange portion 20a on the disk portion 12c increases the strength and rigidity of the metal core 20. Also, this increases the connection between the metal core 20 and the sealing member 21.

The sealing member 21 is formed from synthetic rubber, such as NBR, and integrally adhered to the metal core 20 by vulcanized adhesion. The sealing member 21 includes the inclined radially outward side lip 13a, the dust lip 13b, the grease lip 13c and weir portion 22. The dust lip 13b is inclined radially outward at a radially inner position from the side lip 13a. The grease lip 13c is inclined radially inward. The weir portion 22 covers an exposed surface of the metal core 20 over a region that includes the disk portion 12c of the metal core 20.

According to this modification, a fitting surface 22a, of a predetermined width, is formed on the inner circumference of the weir portion 22 of the sealing member 21. Undercut 22b are formed on both sides of the fitting surface 22a. The undercut portions 22b enable elastic deformation of the fitting surface 22a of the weir portion 22 to be absorbed by the undercut portions 22b. Thus, this enables a large interference of the fitting surface 22a. Accordingly, it is possible to further improve the sealability of the fitting surface 22a relative to the outer member.

FIG. 6 is a modification of the seal 14 of FIG. 3. This seal 23 is different from the seal 14 only in part of the structure of the weir portion. Thus, the same reference numerals are used to designate the same parts and their detailed description will be omitted.

The seal 23 is an integrated seal including a metal core 20 and a sealing member 24. The metal core 20 is press-fit onto the inner circumference of the outer-side end of the outer member 5". The sealing member 24 is adhered to the metal core 20. The sealing member 24 is formed from synthetic rubber, such as NBR, and integrally adhered to the metal core 20 by vulcanized adhesion. The sealing member 24 includes the inclined radially outward side lip 13a, the dust lip 13b, the grease lip 13c and a weir portion 24a. The dust lip 13b is inclined radially outward at a radially inner position from the side lip 13a. The grease lip 13c is inclined radially inward. The weir portion 24a extends from the root of the side lip 13a. The weir portion 24a covers a surface of the disk portion 12c of the metal core 20 and has a width larger than that of the weir portion 15a, previously described. The weir portion 24a elastically contacts the chamfered portion 5d of the outer member 5". Thus, this improves the sealability between the weir portion 24a and the outer member 5.

FIG. 7 is a modification of the seal 23 of FIG. 6. This seal 23 itself is the same as that of FIG. 6. Here, the seal 23 slidably contacts an annular metal member 25. Thus, the same reference numerals are used to designate the same parts and their detailed description will be omitted.

According to this modification, the side lip 13a, the dust lip 13b and the grease lip 13c slidably contact the annular metal member 25 fit onto the base portion 6b of the wheel mounting flange 6. The annular metal member 25 is press-formed from steel sheet having corrosion resistance, such as austenitic-stainless steel sheet or preserved cold rolled steel sheet. The annular metal member 25 includes a curved portion 25a, a disk portion 25b and a ceiling portion 25c. The curved portion 25a is formed with a circular arc cross-section corresponding to the curved surface of the base portion 6b. The disk portion 25b is adapted to closely contact the inner-side surface of the base portion 6b. The ceiling portion 25c axially extends from the radially outermost portion of the disk portion 25b in a direction away from the wheel mounting flange 6.

The ceiling portion 25c of the annular metal member 25 opposes the seal 23 of the weir portion 24a of the sealing member 24, via a small gap, to form a labyrinth seal 26. A sealing member 27 is integrally adhered to the ceiling portion 25c, via vulcanized adhesion. The sealing member 27 includes synthetic rubber, such as NRB etc., and is adapted to elastically contact the inner-side surface of the base portion 6b. This makes it possible to prevent muddy water from directly entering onto the side lips 13a and also from entry into the wheel bearing apparatus via the fitting portion between the side surface of the base portion 6b and the annular metal member 25.

The annular metal member 25 prevents the generation of corrosion at the lip sliding surface. In addition, the annular metal member has a surface roughness Ra of 0.2-0.6. Thus, it is possible to obtain a superior sealing slide surface and to suppress wear of the lips and to keep the sealability of the seal for a long term, if the wheel bearing is used under a severe environment. In this case, "Ra" is one of the geometric parameters of JIS (JIS B0601-2001). Ra means the arithmetic average of the roughness, i.e. the average of absolute value deviations from the average line.

The base portion 6b is formed with a surface of circular arc-shaped cross-section of a predetermined radius of curvature "r". The curved portion 25a of the annular metal member 25 is formed with a circular arc cross-section of a predetermined radius of curvature "R" (R≥r). This prevents the annular metal member 25 from floating from the circular arc surface of the base portion 6b. This is due to the interference of the curved portion 25a of the annular metal member 25 with the circular arc surface of the base portion 6b when the annular metal member 25 is fit onto the base portion 6b. Accordingly, it is possible to prevent the generation of a gap between the side surface of the base portion 6b and the disk portion 25b of the annular metal member 25. Also, it is possible to keep stable sealability while suppressing the variation of interference of the side lip 13a, dust lip 13b and grease lip 13c.

FIG. 8 is a modification of the seal 19 of FIG. 5. This seal 19 is different from the seal 14 only in part of the structure of the weir portion. Thus, the same reference numerals are used to designate the same parts and their detailed description will be omitted.

The seal 28 is an integrated seal including the metal core 20 and the sealing member 29. The metal core 20 is press-fit onto the inner circumference of the outer-side end of the outer member 5. The sealing member 29 is adhered to the metal core 20. The sealing member 29 is formed of synthetic rubber, such as NBR, and is integrally adhered to the metal core 20 by vulcanized adhesion. The sealing member 29 includes the inclined radially outward side lip 13a, the dust lip 13b, the grease lip 13c and a weir portion 30. The dust lip 13b is inclined radially outward at a radially inner position from the side lip 13a. The grease lip 13c is inclined radially inward. The weir portion 30 is integrally formed to cover a surface of the disk portion 12c of the metal core 20.

The fitting surface 22a, with a predetermined width, is formed on the inner circumference of the weir portion 30 of the sealing member 29. Undercut portions 22b are formed on both sides of the fitting surface 22a. In addition, the weir portion 30 is formed with an overhang portion 30a that projects toward the wheel mounting flange 6. Thus, the overhang portion 30a opposes the inner-side surface 6c of the wheel mounting flange 6, via a small axial gap to form the labyrinth seal 26. This makes it possible to further improve the sealability of the fitting portion between the seal 28 and the outer member 5. Thus, this prevents muddy water from directly entering onto the side lips 13a as well as improves the sealability and durability of the seal 28.

FIGS. 9(a)-(c) show modifications of the weir portion of the sealing member. These modifications are different from embodiments previously described only in the configuration of the outer circumference of the weir portion. Thus, the same reference numerals are used to designate the same parts and their detailed description will be omitted.

A weir portion 31 shown in FIG. 9(a) is formed on its inner circumference with the fitting surface 22a. The fitting surface 22a has a predetermined width and undercut portions 22b formed on both sides of the fitting surface 22a. In addition, the weir portion 31 is formed with an inclined surface 31a on its outer circumference. The inclined surface 31a has a gradually reducing diameter toward the inner-side of the bearing. A weir portion 32 shown in FIG. 9(b) is formed on its inner circumference with the fitting surface 22a. The fitting surface 22a has a predetermined width and undercut portions 22b formed on both sides of the fitting surface 22a. In addition, the weir portion 32 is also formed with an inclined surface 32a on its outer circumference. The inclined surface 32a has a gradually reducing diameter toward the outer side of the bearing. The inclined surfaces 31a, 32a of weir portions 31, 32 reduces material and manufacturing cost and improves moldability.

A weir portion 33, shown in FIG. 9(c), is formed on its inner circumference with the fitting surface 22a. The fitting surface 22a has a predetermined width and undercut portions 22b formed on both sides of the fitting surface 22a. In addition, the weir portion 33 is also formed with a plurality of circumferential grooves 33a on its outer circumference. The circumferential grooves 33a discharge muddy water etc. that overflow, via the outer surface of the outer member, to the outside. Thus, this improves the sealability and the durability of the seal by preventing direct entry of muddy water onto the side lip 13a.

The present disclosure can be applied to wheel bearing apparatus of the second, third and fourth generation type where seals are arranged in annular openings between an inner member, forming a rotor-side member, and an outer member, forming a stator-side member.

The present disclosure has been described with reference to the preferred embodiments. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

What is claimed is:

1. A vehicle wheel bearing apparatus comprising:
an outer member formed with a body mounting flange on its outer circumference, the body mounting flange to be mounted on a knuckle, and the outer member inner circumference including double row outer raceway surfaces;
an inner member includes a wheel hub and an inner ring, the wheel hub is formed, on its one end, with a wheel mounting flange for mounting a wheel, a cylindrical portion axially extends from the wheel mounting flange, the inner ring is press-fit onto the cylindrical portion of the wheel hub, the inner member is formed with double row inner raceway surfaces on its outer circumference, the double row inner raceway surfaces opposes the double row outer raceway surfaces;
double row rolling elements are freely rollably contained between the outer raceway surfaces of the outer member and the inner raceway surfaces of the inner member; and
seals are mounted within annular openings formed between the outer member and the inner member;
the outer-side seal of the seals comprises a metal core and a sealing member, the metal core including a cylindrical portion, a radially inner portion and a disk portion, the cylindrical portion is press-fit onto the outer-side end inner circumference of the outer member, the radially inner portion is bent and extends radially inward from the cylindrical portion, the disk portion extends radially outward from the cylindrical portion and is adapted to contact an outer-side end face of the outer member, the sealing member is integrally adhered, via vulcanized adhesion, to the radially inner portion of the metal core; and
the sealing member comprises an integrally formed side lip and weir portion, the side lip is inclined radially outward and adapted to slidably contact an inner-side base portion of the wheel mounting flange, via an axial interference, the weir portion of the sealing member has a terminal end surrounding an end of the disk portion, the terminal end has a pair of opposing parallel sides that define planes that extend radially away from the outer circumference of the outer member and the weir portion is formed around the outer circumference of the radially extending disk portion of the metal core to cover faces of the radially extending disk portion and to adhere to the metal core, the weir portion projects radially outward from the outer circumference of the outer-side end of the outer member and elastically contacts the outer circumference of the outer member.

2. The vehicle wheel bearing apparatus of claim 1, wherein the outer circumference on the outer member at the outer-side end of the outer member is formed with a smaller diameter portion by a machining process, the inner circumference of the weir portion, of the sealing member elastically contacts the smaller diameter portion.

3. The vehicle wheel bearing apparatus of claim 1, wherein the end of the outer member is formed with a chamfered portion by a machining process, the inner circumference of the weir portion of the sealing member elastically contacts the chamfered portion.

4. The vehicle wheel bearing apparatus of claim 1, wherein the weir portion of the sealing member is adhered to the metal core and covers the exposed surface of the metal core.

5. The vehicle wheel bearing apparatus of claim 1, wherein a projected fitting surface with a predetermined width is formed on an inner circumference of the weir portion of the sealing member and an undercut portion is formed on one side or both sides of the fitting surface.

6. The vehicle wheel bearing apparatus of claim 1, wherein an outer circumference of the weir portions of the sealing member is formed with an inclined surface.

7. The vehicle wheel bearing apparatus of claim 1, wherein a plurality of circumferential grooves are formed on an outer circumference of the weir portion of the sealing member.

8. The vehicle wheel bearing apparatus of claim 1, wherein the weir portion of the sealing member opposes the inner-side surface of the wheel mounting flange to form a labyrinth seal.

9. The vehicle wheel bearing apparatus of claim 1, wherein the sealing member further comprises an integrally formed dust lip and grease lip, the dust lip is inclined radially outward at a radially inner position from the side lip, the grease lip is inclined toward the inner-side of the bearing and the base portion of the inner side of the wheel mounting flange is formed with a curved surface of a circular arc cross section, and the side lip and the dust lip slidably contact the base portion via a predetermined axial interference.

10. The vehicle wheel bearing apparatus of claim 1, wherein a tip end of the disk portion of the metal core is bent to form a bent edge portion.

11. The vehicle wheel bearing apparatus of claim 1, wherein the inner-side base portion of the wheel mounting flange is formed with a circular arc cross-section of a predetermined radius of curvature, an annular metal member is fit on the base portion, the annular metal member comprising a curved portion, a disk portion, and a ceiling portion, the curved portion is formed with a circular arc cross-section corresponding to the curved surface of the base portion, the disk portion is adapted to closely contact the inner-side surface of the base portion and extend radially outwardly from the curved portion, the ceiling portion axially extends from the radially outermost portion of the disk portion in a direction away from the wheel mounting flange, a radius of curvature "r" of the base portion is larger than a radius of curvature "R" of the curved portion of the annular metal member, and the side lip and the dust lip slidably contact the annular metal member, via a predetermined axial interference and the grease lip also slidably contacts the annular metal member via a predetermined radial interference.

12. The vehicle wheel bearing apparatus of claim 11, wherein the ceiling portion of the annular metal member opposes the weir portion of the sealing member to form a labyrinth seal.

13. The vehicle wheel bearing apparatus of claim 11, wherein the annular metal member is press-formed from a steel sheet having corrosion resistance and being finished to have the surface roughness Ra of 0.2-0.6.

* * * * *

UNITED STATES PATENT AND TRADEMARK OFFICE
CERTIFICATE OF CORRECTION

PATENT NO.       : 9,090,122 B2
APPLICATION NO.  : 13/874742
DATED            : July 28, 2015
INVENTOR(S)      : Shunsuke Morita Page 1 of 1

It is certified that error appears in the above-identified patent and that said Letters Patent is hereby corrected as shown below:

Specification

<u>Column 8</u>
Line 3       "press-lit" should be --press-fit--

<u>Column 11</u>
Line 67      "($R \geq r$)." should be --($R \geqq r$).--

Signed and Sealed this
Twenty-second Day of March, 2016

Michelle K. Lee
*Director of the United States Patent and Trademark Office*